United States Patent
Bolis

(10) Patent No.: US 9,869,802 B2
(45) Date of Patent: Jan. 16, 2018

(54) OPTICAL DEVICE WITH FOCAL LENGTH VARIATION

(71) Applicant: WAVELENS, Grenoble (FR)

(72) Inventor: Sebastien Bolis, Crolles (FR)

(73) Assignee: Webster Capital, LLC, Wilmington, DE (US)

( * ) Notice: Subject to any disclaimer, the term of this patent is extended or adjusted under 35 U.S.C. 154(b) by 0 days.

(21) Appl. No.: 15/106,800

(22) PCT Filed: Dec. 18, 2014

(86) PCT No.: PCT/EP2014/078516
§ 371 (c)(1),
(2) Date: Jun. 20, 2016

(87) PCT Pub. No.: WO2015/091834
PCT Pub. Date: Jun. 25, 2015

(65) Prior Publication Data
US 2017/0017019 A1    Jan. 19, 2017

(30) Foreign Application Priority Data
Dec. 20, 2013  (FR) ..................................... 13 63256

(51) Int. Cl.
*G02B 26/00* (2006.01)
*G02B 3/14* (2006.01)

(52) U.S. Cl.
CPC ............. *G02B 3/14* (2013.01); *G02B 26/004* (2013.01)

(58) Field of Classification Search
CPC ........ G02B 3/14; G02B 26/00; G02B 26/004; G02B 26/005; G02B 7/04; G02B 26/08;
(Continued)

(56) References Cited

U.S. PATENT DOCUMENTS 6,188,526 B1   2/2001  Sasaya et al.
7,369,723 B1   5/2008  Mescher
(Continued)

FOREIGN PATENT DOCUMENTS

CN   102150064   8/2011

OTHER PUBLICATIONS

Office Action from Chinese Application No. 201480068912.0, dated Mar. 10, 2017 (English translation and Chinese version), pp. 1-12.
(Continued)

*Primary Examiner* — Euncha Cherry
(74) *Attorney, Agent, or Firm* — Robert C. Kowert; Meyertons, Hood, Kivlin, Kowert & Goetzel, P.C.

(57) ABSTRACT

An optical device with focal length variation including a first deformable membrane, a second deformable membrane, and a support to which a respective peripheral anchoring area of each of said membranes is connected. A constant volume of fluid is enclosed between the first and the second membrane, said fluid producing mechanical coupling of said first and second membranes. An actuation device of a region of the first membrane located between the anchoring area and a central part of the first membrane, configured to deform by application of electrical actuation voltage in a single direction of deflection to displace at least a portion of the fluid volume, said displacement of fluid being likely to cause deformation of the central part of the first membrane based on application of an electrical actuation voltage to the actuation device.

18 Claims, 12 Drawing Sheets

(58) Field of Classification Search
CPC .... G02B 27/646; G02B 26/0825; G02B 3/12; G02B 7/36
USPC ........................................................ 359/291
See application file for complete search history.

(56) References Cited

U.S. PATENT DOCUMENTS 8,755,124 B2 * 6/2014 Aschwanden ........... G02B 3/14
                                                     359/666
2010/0118414 A1    5/2010 Bolis

OTHER PUBLICATIONS

International Search Report and Written Opinion from PCT/EP2014/078516, dated Jun. 30, 2016 (English Translation and French Version), Wavelens, pp. 1-20.

* cited by examiner

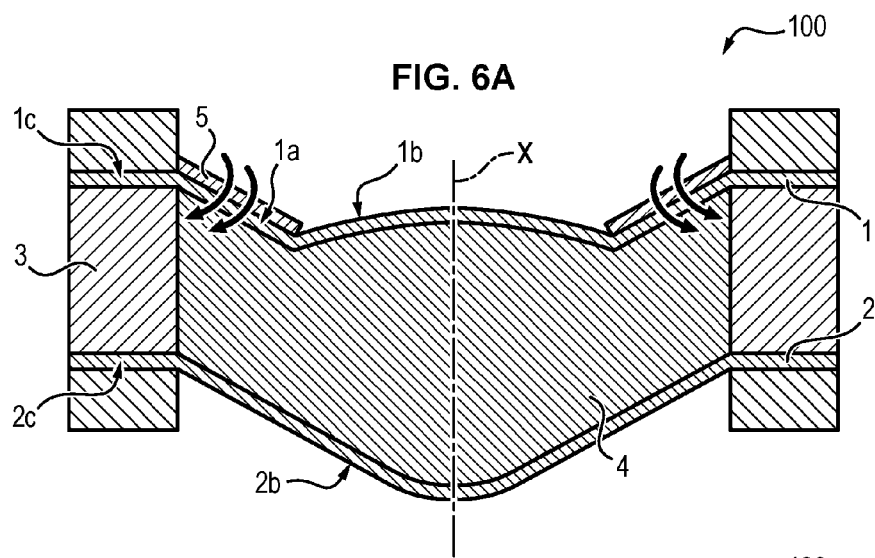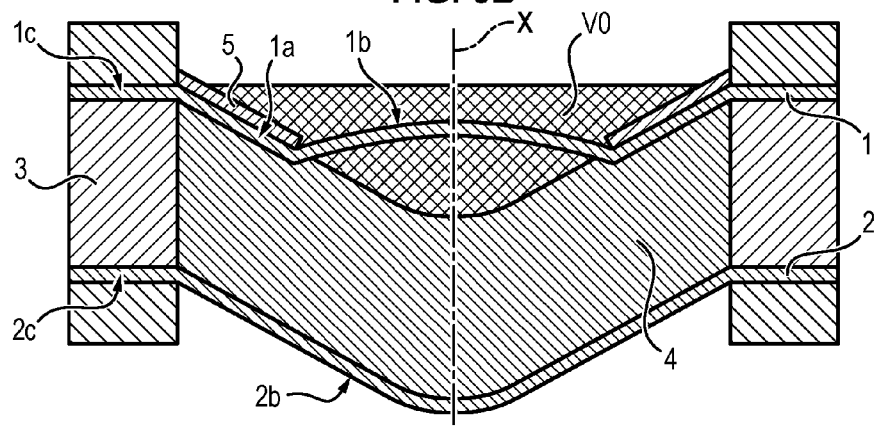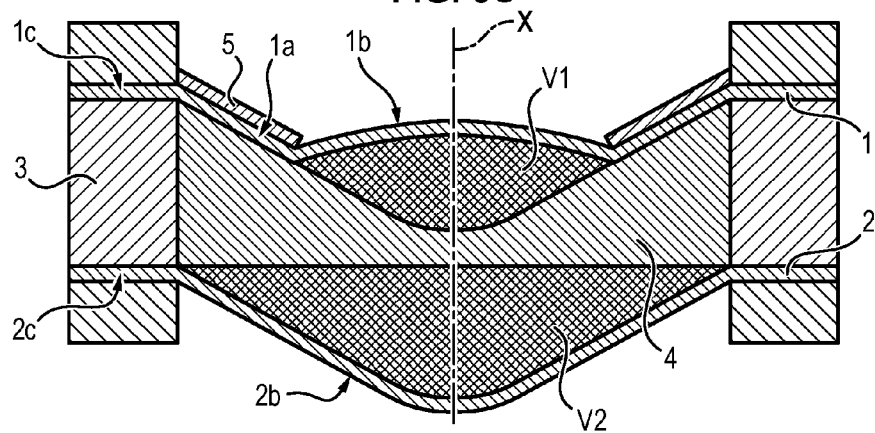

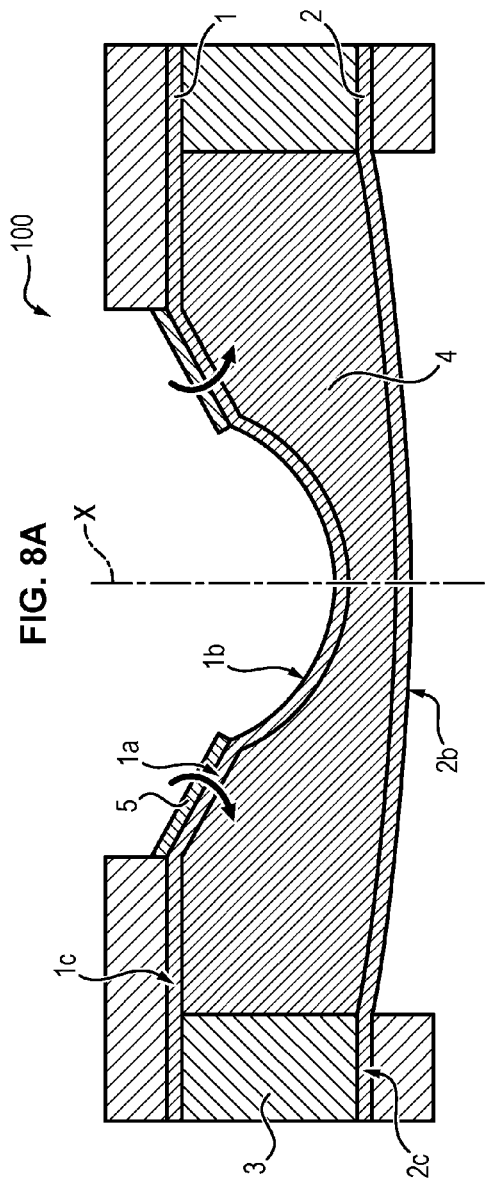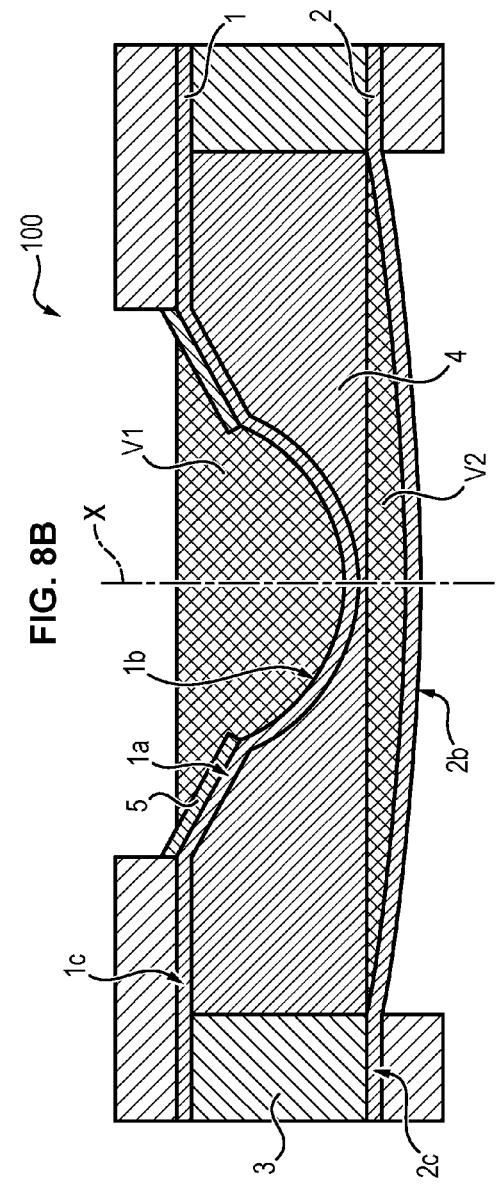

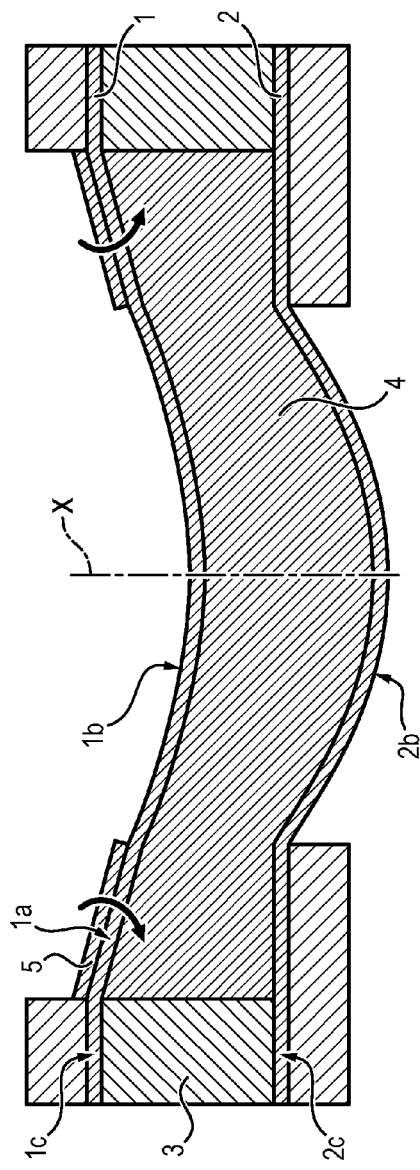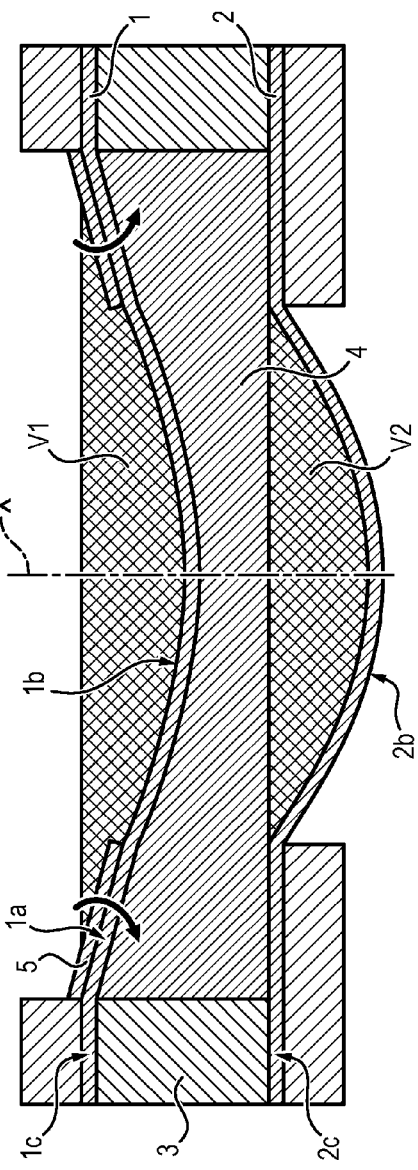

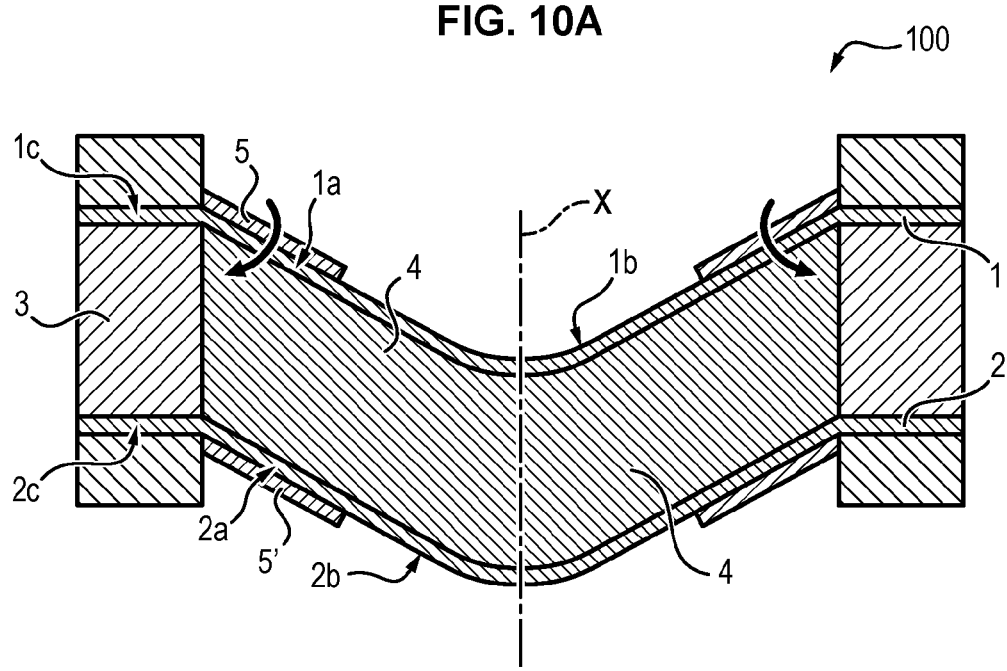
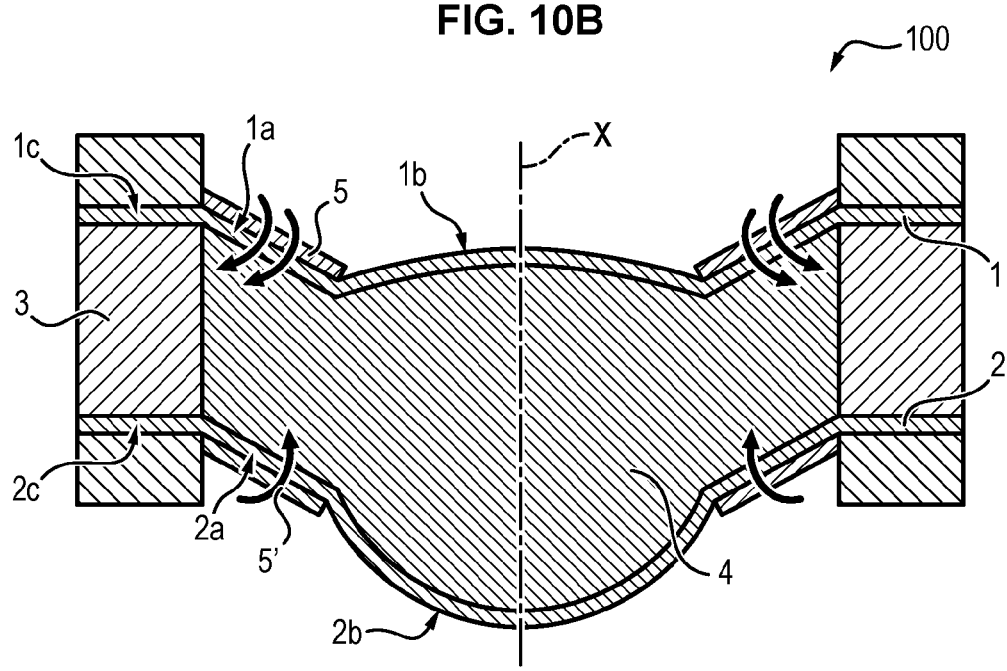

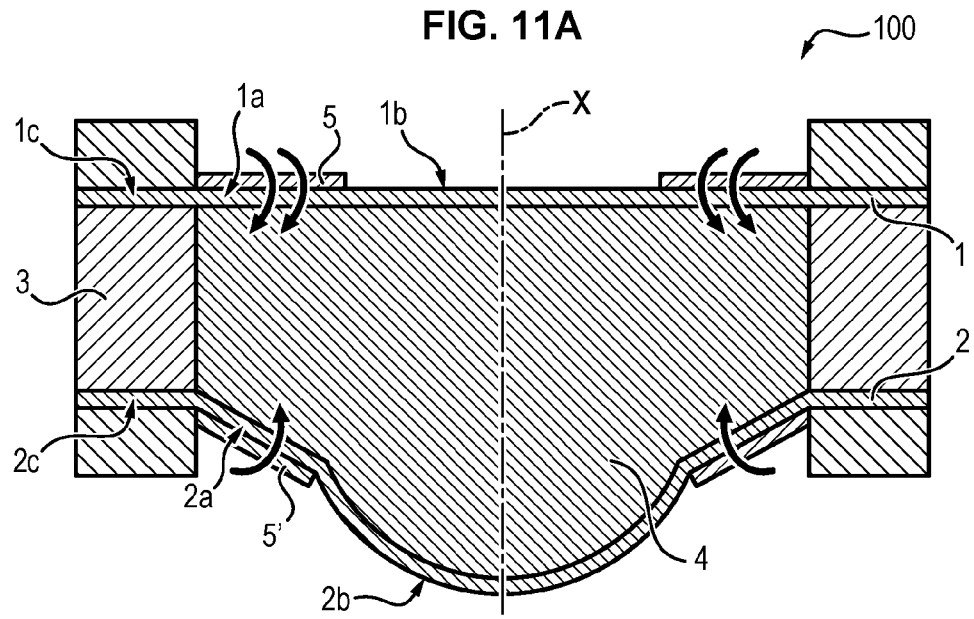
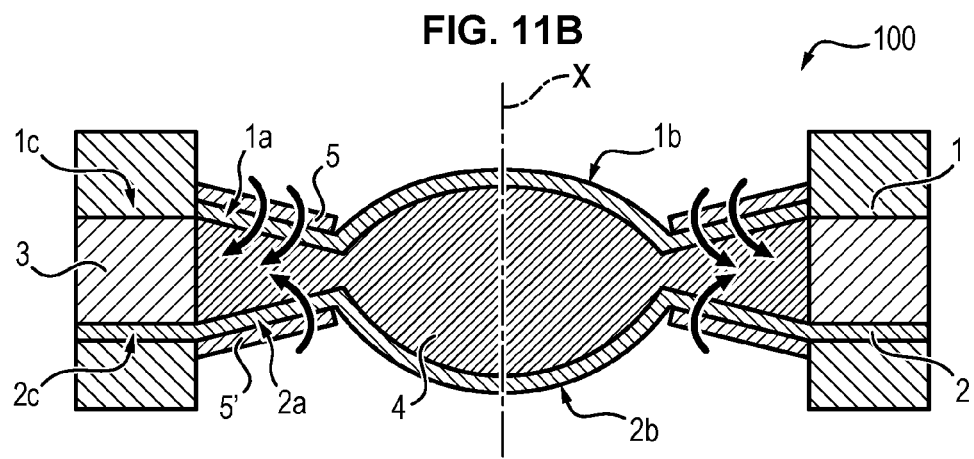
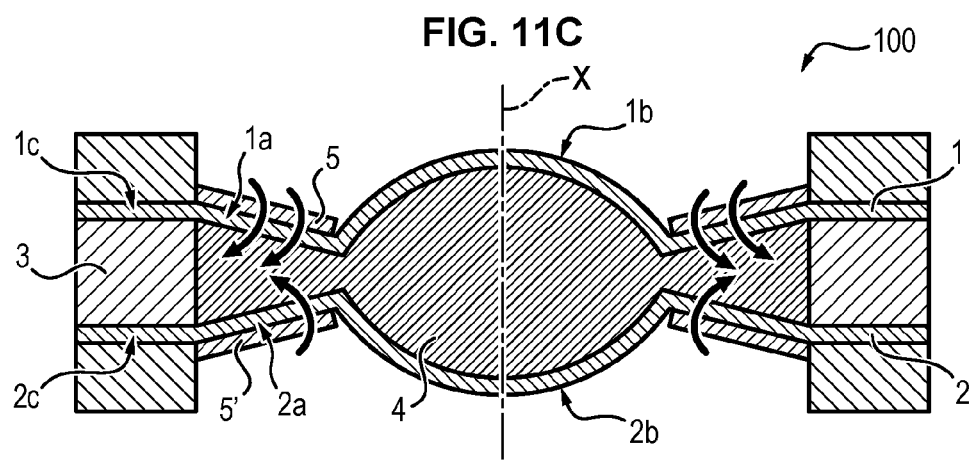

OPTICAL DEVICE WITH FOCAL LENGTH VARIATION

FIELD OF THE INVENTION

The present invention relates to an optical device with focal length variation and a method of variation of the focal length of such an optical device.

BACKGROUND OF THE INVENTION

To integrate the optical zoom function in a compact optical system comprising several lenses with fixed focal length, it can be interesting, especially in light of minimizing the thickness of the optical system, to integrate at least one optical device with variable focal length to create major variations in focal length.

Some optical devices ensure a variation in magnification, and others have to be linked to fixed optics or to other devices with variable focal length to ensure zoom function.

For applications with miniature cameras, especially cameras designed for mobile telephony, the aim is to design an optical device with variable focal length which is compact and inexpensive.

A device for working either in a divergent mode or in a convergent mode is particularly advantageous as it benefits from a wider range in variation of focal length.

Different types of devices having variable focal length based on liquid have been developed to respond to this need, based for example on an electrowetting technique [1] or based on liquid crystals [2].

Other solutions are based on the use of deformable membranes subject to fluid pressure, each membrane forming a diopter.

Two membranes are generally employed to boost the optical power of the device.

In these devices, the membranes deform under the effect of the fluid pressure caused by a fluid displacement.

In some applications, each of the two membranes is actuated independently of the other, each membrane being associated with a cavity enclosing the fluid, which is separated from the other by a substrate, and having its own actuation device [3, 4].

The fluid pressure imposed on one of the membranes can be different from the other.

Different configurations of lenses, where the actuators intended to vary focal length are arranged at the periphery of each membrane, are presented in FIGS. 1A and 1B.

FIG. 1A illustrates a bi-convex convergent lens, which can be symmetrical or not.

This device comprises a support 3 to which two deformable membranes 1, 2 are connected in a respective peripheral anchoring area 1c, 2c, and a rigid plate 31 extending between both membranes. Each membrane 1, 2, with the support 3 and the plate 31, defines a respective constant volume of fluid 41, 42. Due to the presence of the rigid plate 31 interposed between the volumes of fluid 41 and 42, the deformations of both membranes are independent of each other.

Each membrane 1, 2 is provided with an actuation device 5, 5' arranged on a respective intermediate area 1a, 2a between the central part 1b, 2b and the anchoring area 1c, 2c of each membrane.

The actuators 5, 5' of both membranes 1, 2 deflect towards the membrane and the fluid 41, 42 (in the direction of the arrows) to create the bi-convex configuration illustrated in FIG. 1A.

FIG. 1B corresponds to a bi-concave divergent lens which can be symmetrical or not.

The structure of the device is similar to that of the device of FIG. 1A, the actuation device 5, 5' of each membrane being capable of deflecting in the direction opposite that of FIG. 1A (in the direction of the arrows) to create such a configuration.

To the extent where both diopters function independently of each other, it is also possible to obtain many other configurations of convergent lenses (convex plane or convergent meniscus) or divergent (concave plane or divergent meniscus).

FIGS. 2A to 2C illustrate another example of an optical device exhibiting a structure similar to that of FIG. 1A, in which the membrane 2 ensures the convergent function (with deflection of the actuation device 5' in one direction, towards the fluid) and the membrane 1 ensures the divergent function (with deflection of the actuation device 5 in the opposite direction), each membrane being associated with an independent volume of fluid 41, 42. The elements designated by the same reference numerals in FIGS. 1A-1C and 2A-2C are similar.

FIG. 2A illustrates the optical device at rest, taking the example of an initial infinite focal length.

FIG. 2B illustrates the optical device actuated so as to be convergent: for this purpose, the actuation device 5 is not activated, and only the actuation device 5' is activated so as to flex towards the fluid 42, resulting in a convex plane convergent lens.

FIG. 2C illustrates the optical device actuated so as to be divergent: for this purpose, the actuation device 5' is not activated, and only the actuation device 5 is activated so as to flex towards the fluid 41, resulting in a concave plane divergent lens.

In other applications, both membranes are coupled by a constant volume of fluid enclosed between said membranes [5-10], both membranes are subject to the same fluid pressure.

FIGS. 3A and 3B illustrate such optical devices. Relative to the device illustrated in FIGS. 1A to 2C, the device in FIGS. 3A and 3B contains no plate separating the volumes of fluid associated with each membrane. The device therefore contains a single constant volume of fluid 4 mechanically coupling the membranes 1 and 2.

In these devices, the actuation devices 5, 5' of both membranes jointly contribute to modify the fluid pressure applied to each of said membranes.

When the actuation devices 5, 5' deflect towards the fluid 4, the pressure is increased and both membranes 1, 2 become convex (convergent device, see FIG. 3A).

When the actuation devices 5, 5' deflect in the direction opposite the fluid 4, both membranes 1, 2 become concave (divergent device, see FIG. 3B).

To produce an optical system which can have variations in positive and negative focal length from a rest position, the actuation devices must function in both directions.

However, such actuation is complex to implement.

In fact, the electrical voltages required for the actuators are typically above 30V (voltage +/−40V is mentioned in [3]).

In existing devices, thick layers of piezoelectric materials are stuck onto each membrane, which involves a complex manufacturing method and imposes a certain number of restrictions on the membrane and on the geometry of the device.

It is however possible to carry out such dual-direction actuation by using MEMS technologies.

Either materials which are capable of deforming in both directions should be used, but these materials (AlN for example) are less effective in terms of actuation, or a bimorphic actuator comprising two layers of PZT ceramic (Lead Titano-Zirconate) should be used.

Given that PZT ceramic has a high manufacturing cost, this latter option is particularly costly.

The device illustrated in FIGS. 2A to 2C can be alternatively convergent and divergent, by using actuators operating in a single direction.

The disadvantage of such a device, which consists of superposing two single-membrane devices, is that it offers variations in focal lengths much less than the variations produced by the devices illustrated in FIGS. 1A-1B and 3A-3B.

In fact, a single diopter is active in the convergent configuration, the other diopter being active in the divergent configuration.

BRIEF DESCRIPTION OF THE INVENTION

An aim of the invention is therefore to design an optical device producing a variation in focal length over an extended range and enabling simple actuation (especially producing low electrical actuation voltages), which is compact and simple to make.

In accordance with the invention, an optical device with focal length variation is proposed, comprising:
   a first deformable membrane,
   a second deformable membrane,
   a support to which a respective peripheral anchoring area of each of said membranes is connected,
   a constant volume of fluid enclosed between the first and the second membrane, said fluid producing mechanical coupling of said first and second membranes,
   an actuation device of a region of the first membrane located between the anchoring area and a central part of the first membrane, configured to deform by application of electrical actuation voltage in a single direction of deflection so as to displace some of the fluid volume, said fluid displacement being likely to cause deformation of the central part of the first membrane,
said optical device being characterized in that the central part of the first membrane has sufficient stiffness so that:
   from a rest position in which the actuation device is inactive, the first membrane deforms only in a first direction when electrical actuation voltage less than a threshold is applied to the actuation device and the second membrane deforms to absorb the fluid displacement caused by deformation of the first membrane so as to minimize pressure of the fluid on the first membrane, and
   the actuation region of the first membrane remaining deformed in said first direction, the central part of the first membrane deforms in a second direction opposite the first direction under the effect of the pressure of the fluid displaced by the actuation device when electrical actuation voltage greater than said threshold is applied to the actuation device.

Advantageously, the second membrane exhibits stiffness less than the central part of the first membrane.

According to an embodiment, the optical device further comprises an actuation device of an actuation region of the second membrane located between the anchoring area and a central part of said membrane configured to deform by application of electrical actuation voltage.

According to an embodiment, the actuation device of the second membrane is capable of deforming in two opposite directions as a function of the electrical actuation voltage applied to said device.

According to an embodiment, in its rest configuration the central part of the first membrane is planar.

According to an embodiment, the optical device comprises a substrate extending between both membranes and comprising at least one fluid passage opening such that the fluid pressure is identical on either side of said substrate.

The material of the first and/or the second membrane can be a siloxane resin or mineral material comprising silicon.

According to an advantageous embodiment, the actuation device of the first membrane comprises at least one piezoelectric actuator.

According to an embodiment of the invention, the first or the second membrane is reflecting.

The stiffness of the first membrane can advantageously be selected so that in the absence of fluid pressure exerted on said membrane the application of electrical actuation voltage to the actuation device causes deformation of the actuation region and of the central part of the membrane, the tangents to the membrane on either side of the junction between the actuation region and the central part being combined.

According to an embodiment, the diameter of the deformable part of the first membrane is different from the diameter of the deformable part of the second membrane.

According to another embodiment, the diameter of the deformable part of the first membrane is identical to the diameter of the deformable part of the second membrane.

Another aim relates to a method for variation of the focal length of an optical device comprising
   a first deformable membrane,
   a second deformable membrane,
   a support to which a respective peripheral anchoring area of each of said membranes is connected,
   a constant volume of fluid enclosed between the first and the second membrane, said fluid producing mechanical coupling of said first and second membranes,
   an actuation device of a region of the first membrane located between the peripheral anchoring area and a central part of said membrane, configured to deform by application of electrical actuation voltage in a single direction of deflection,
said method being characterized in that it comprises:
application to the actuation device of first electrical actuation voltage less than a threshold resulting in deforming the first membrane in a first direction whereas the second membrane deforms to absorb the fluid displacement caused by deformation of the first membrane so as to minimize the pressure of the fluid on the first membrane,
application to the actuation device of second electrical actuation voltage greater than said threshold, resulting in deforming the central part of the first membrane in a second direction opposite the first direction under the effect of the pressure of the fluid displaced by the actuation device, the actuation region of the first membrane remaining deformed in the first direction.

According to an embodiment:
   at rest the first and the second membrane each form a plane diopter,
   the first electrical actuation voltage is applied so as to deform the actuation region and the central part towards the fluid, the second membrane deforming in the direction opposite the fluid such that the central part of the first membrane forms a divergent diopter and the second membrane forms a convergent diopter, the second electrical voltage is applied so as to deform the actuation region towards the fluid, the fluid displacement causing deformation of the central part in the direction opposite the fluid, such that the central part of each of the two membranes a convergent diopter.

According to an embodiment, the diameter of the deformable part of the first membrane is less than the diameter of the deformable part of the second membrane and:

at rest the first and the second membrane each form a plane diopter, the first electrical actuation voltage is applied so as to deform the actuation region and the central part towards the fluid, the second membrane deforming in the direction opposite the fluid, such that the optical device forms a divergent meniscus.

According to an embodiment, the diameter of the deformable part of the first membrane is greater than the diameter of the deformable part of the second membrane and:

at rest the first and the second membrane each form a plane diopter, the first electrical actuation voltage is applied so as to deform the actuation region and the central part towards the fluid, the second membrane deforming in the direction opposite the fluid, such that the optical device forms a convergent meniscus.

According to an embodiment, the optical device comprises an actuation device of an actuation region of the second membrane located between the anchoring area and a central part of said membrane, configured to deform by application of electrical actuation voltage and:

at rest the first and the second membrane each form a plane diopter, the first electrical actuation voltage is applied to the actuation device of the first membrane so as to deform the actuation region and the central part towards the fluid without applying electrical actuation voltage of the actuation device of the second membrane, the second membrane deforming in the direction opposite the fluid such that the central part of the first membrane forms a divergent diopter and the second membrane forms a convergent diopter, the second electrical actuation voltage is applied to the actuation device of the first membrane so as to deform the actuation region towards the fluid and electrical actuation voltage is applied to the actuation device of the second membrane towards the fluid so as to increase the convergence of the diopter formed by the central part of the second membrane.

Finally, another object of the invention relates to an imaging device comprising an optical device such as described hereinabove.

BRIEF DESCRIPTION OF DRAWINGS

Other characteristics and advantages of the invention will emerge from the following detailed description in reference to the appended drawings, in which:

FIG. 6A illustrates a configuration of the same optical device as that of FIGS. 5A and 5B, corresponding to electrical actuation voltage higher than in the configuration of FIGS. 5A and 5B, in which the diopter formed by the first membrane is convergent and the diopter formed by the second membrane is also convergent; by way of hatching FIGS. 6B and 6C show volumes of fluid displaced during deformation of membranes in this configuration, FIG. 8A illustrates an optical device according to an embodiment of the invention, in which the first membrane has a diameter less than that of the second membrane, by way of hatching FIG. 8B shows the volumes of fluid displaced during deformation of membranes in the configuration of FIG. 8A, FIG. 9A illustrates an optical device according to an embodiment of the invention, in which the first membrane has a diameter greater than that of the second membrane, by way of hatching FIG. 9B shows the volumes of fluid displaced during deformation of membranes in the configuration of FIG. 9A, FIGS. 10A and 10B show two configurations of an optical device according to an embodiment in which both membranes are actuatable, FIGS. 11A to 11C illustrate different possible configurations of an optical device according to the invention.

Figure 1A:
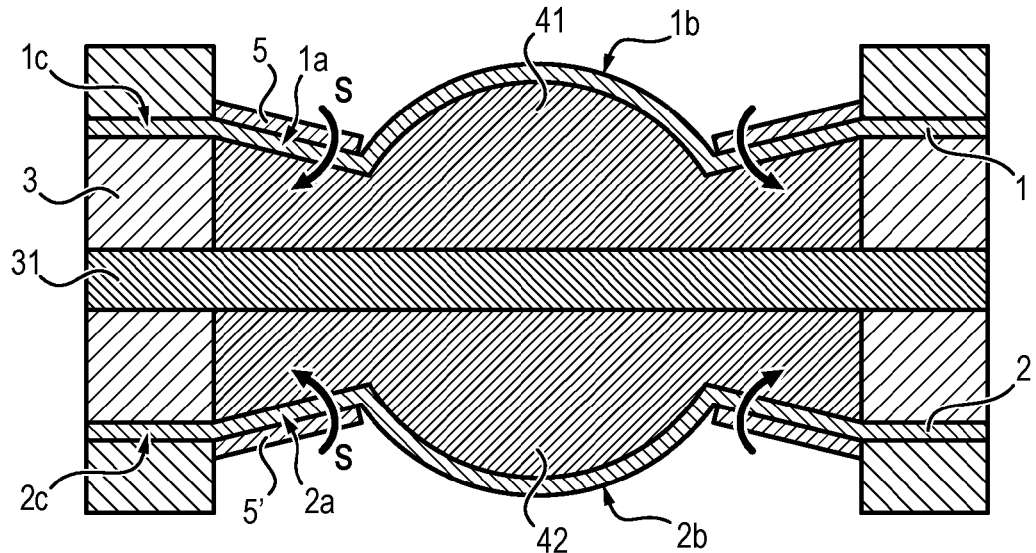
FIGS. 1A and 1B respectively show a section of a bi-convex convergent lens and a bi-concave divergent lens of known type.
Figure 1B:
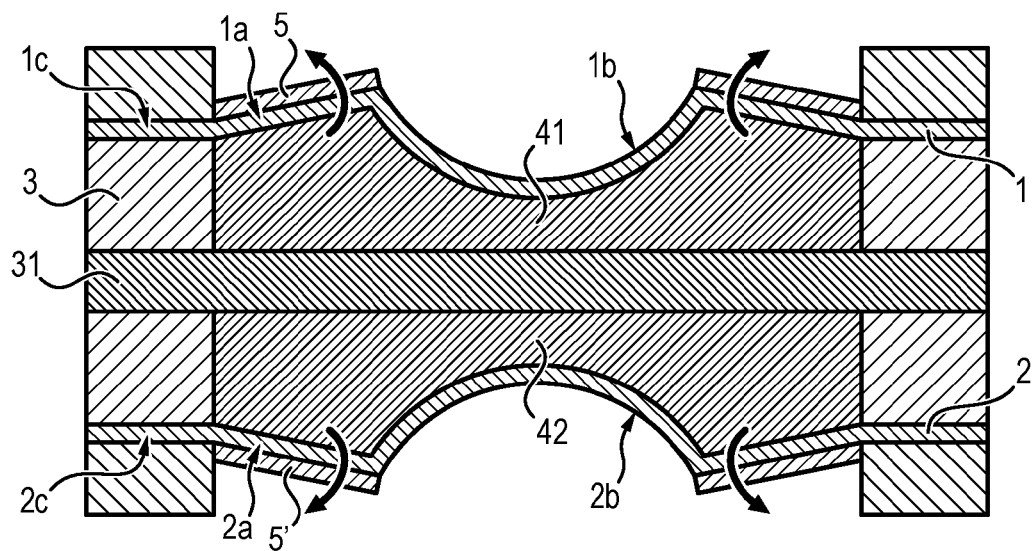
Figure 2A:
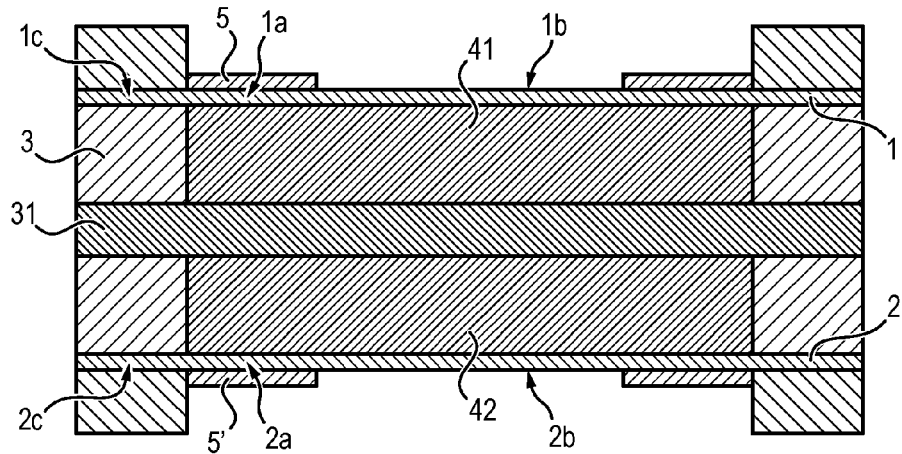
FIGS. 2A to 2C show in section the different states of actuation of an optical device of known type which can be convergent or divergent.
Figure 2B:
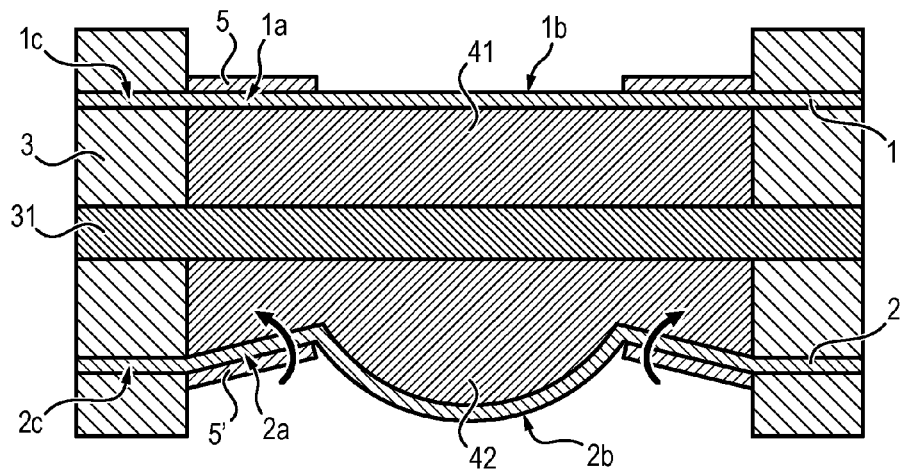
Figure 2C:
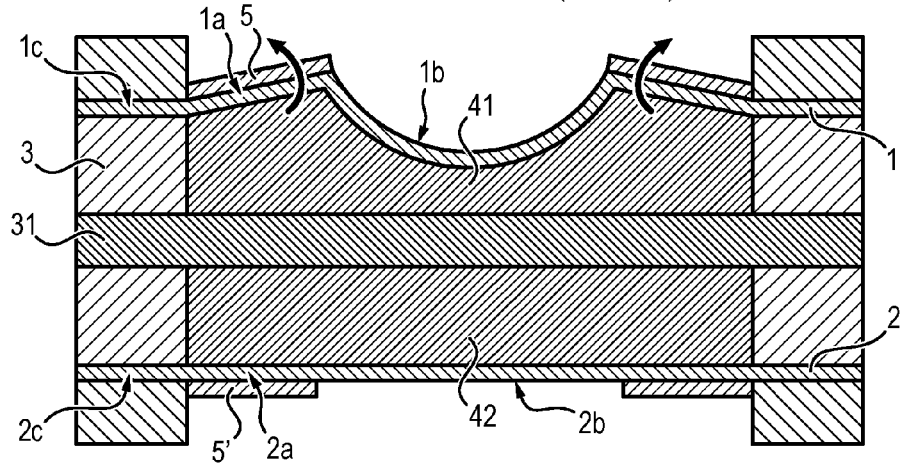
Figure 3A:
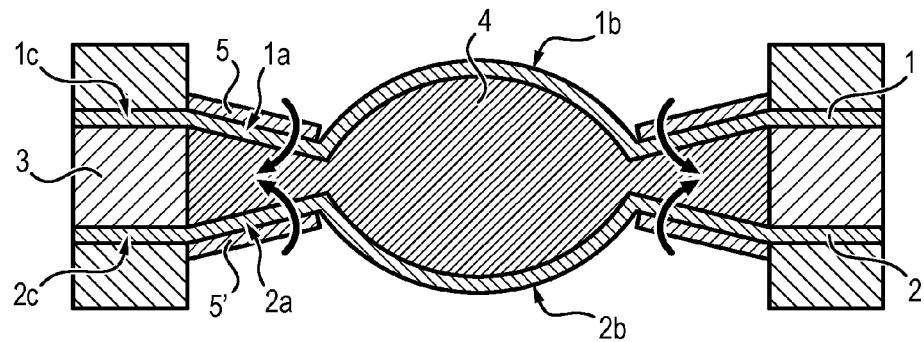
FIGS. 3A and 3B show in section two states of actuation of an optical device of known type in which both membranes are coupled by a fluid volume enclosed between them.
Figure 3B:
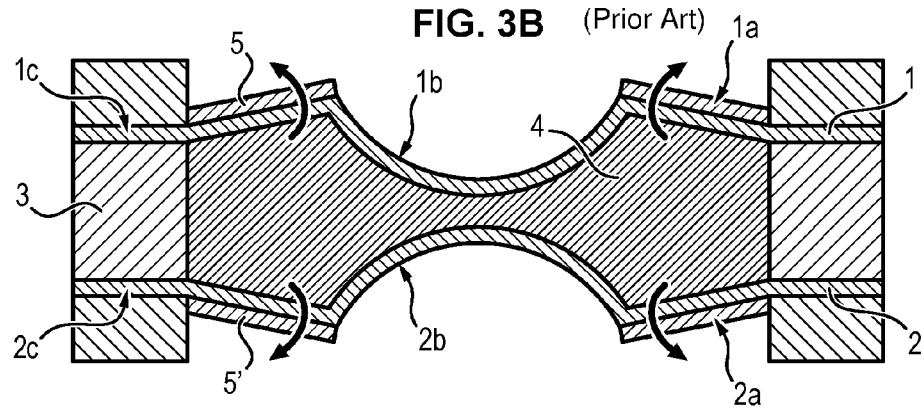

To ensure legibility of the figures, the different elements illustrated are not necessarily illustrated on the same scale.

The reference numerals are used from one figure to the other to designate the same elements.

DETAILED DESCRIPTION OF EMBODIMENTS OF THE INVENTION

FIGS. 5A, 5B and 6A-6C illustrate different actuation configurations of an optical device 100 according to an embodiment of the invention.

The optical device 100 has an optical axis X.

The device 100 comprises two deformable membranes 1, 2, whereof the periphery is sealingly anchored on a support 3.

In this example, the support 3 is in the form of an annular crown whereof the center is designed to receive a volume of fluid 4 contained in a sealed cavity delimited by both membranes 1, 2 and the support 3.

The fluid 4 can be liquid or gas.

The membranes 1 and 2 are anchored on either side of the support 3.

Advantageously, the membranes extend substantially parallel to each other.

Each membrane comprises a respective peripheral anchoring area 1c, 2c.

Each membrane also comprises a respective central part 1b, 2b which corresponds to an optical field of the optical device.

Each membrane therefore comprises a face, called internal face, which is in contact with the fluid 4, and an opposite face, called external face, which is in contact with a second fluid, not referenced, which can be ambient air.

Membrane means any supple and tight film, such that the membrane forms a barrier between the fluid 4 and the fluid located on the opposite face of the membrane.

In the event where the optical device 100 is a lens, which therefore functions in transmission, both membranes 1, 2 are transparent, at least in their central part 1b, 2b, to an optical beam (not shown) intended to propagate through the lens by successively passing through the central part of a first lens, the fluid and the central part of the second lens.

In the event where the optical device 100 is a mirror, the central part of one of the two membranes is reflecting.

Each membrane 1, 2 is capable of deforming reversibly, from a rest position (which can be plane or not), under the action of a displacement of the fluid 4 which varies the thickness of fluid at the level of the central part of each membrane.

The more supple a membrane (in other terms, the lower its stiffness), the greater the deformation caused by a fluid displacement.

The fluid 4 is enclosed between both membranes 1, 2 and produces mechanical coupling of said membranes such that the effect of a fluid displacement cannot be evaluated independently for each of the membranes but combined according to the respective properties of each of the membranes.

The fluid 4 is sufficiently incompressible to move towards the central part of the device when force is applied to a membrane in the direction of the fluid, this force being applied in an intermediate part between the anchoring area and the central part of the membrane.

The forms of the support 3 and membranes 1 and 2 can advantageously be a form of revolution about the optical axis X, but those skilled in the art could select any other form without as such departing from the scope of the present invention.

In the device, at least one of the two membranes is provided with an actuation device. By way of convention, it is considered here that the first membrane, referenced 1, has an actuation device 5; the second membrane, referenced 2, can be provided or not with an actuation device. In the embodiment illustrated in FIGS. 5A-5B and 6A-6C, the second membrane has no actuation device so that its possible deformation results only from the displacement of the fluid 4. Also, even though the actuated membrane 1 is placed on the upper face of the device, it is understood that it could also be placed on the lower face of the device, the membranes 1 and 2 being interchanged.

The actuation device is designed to deform in a single direction, that is, according to the configuration of the device towards the fluid (to successively obtain a divergent then convergent device) or opposite the fluid (to successively obtain a convergent then divergent device).

To the extent where the aim is to vary the focal length of the optical device without deviating the incident beam, the actuation device is adapted to deform uniformly over the entire circumference of the actuation region.

An actuation device particularly adapted to producing a single direction of actuation is based on piezoelectric technology.

It is recalled that a piezoelectric actuator comprises a block of piezoelectric material sandwiched totally or partially between two electrodes, when fed, intended to apply an electrical field to the piezoelectric material. This electrical field is used to control mechanical deformation of the block of piezoelectric material. The block of piezoelectric material can be monolayer or multilayer and extend beyond one electrode.

The actuation device can comprise a single actuator in the form of a crown or else several separate actuators distributed uniformly over the circumference of the membrane.

In this respect reference could be made to a detailed description of such actuation devices in documents FR2919073, FR2950154 and FR2950153.

The actuation device is arranged in a region 1a of the first membrane, called actuation region, located between the peripheral anchoring area 1c and the central part 1b of said membrane. Optionally, the actuation device can extend partly onto the peripheral anchoring area.

In the figures described hereinbelow, the actuation device is represented on the external face of the first membrane. However, the invention is not limited to this embodiment but also allows the actuation device to be arranged on the internal face of the first membrane, or even inside the first membrane.

In the embodiment illustrated in FIGS. 5A-5B and 6A-6C, it is supposed that at rest, that is, when the actuation device 5 of the first membrane is not activated, the first and the second membrane are planar (configuration not shown). However, each of the two membranes could be designed such that at rest it has a concave or convex form without as such departing from the scope of the present invention.

In this embodiment, the membrane 2 is suppler than the central part 1b of the membrane 1.

Figure 5A:
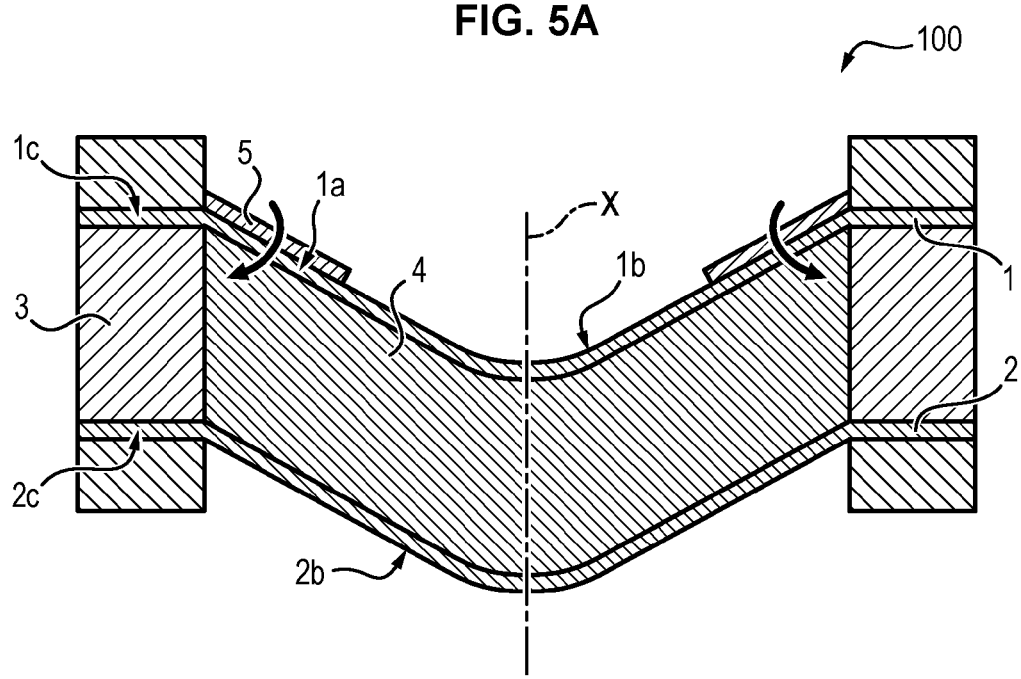
FIG. 5A illustrates a configuration of an optical device according to an embodiment of the invention, in which the diopter formed by the first membrane is divergent and the diopter formed by the second membrane is convergent; by way of hatching
Figure 5B:
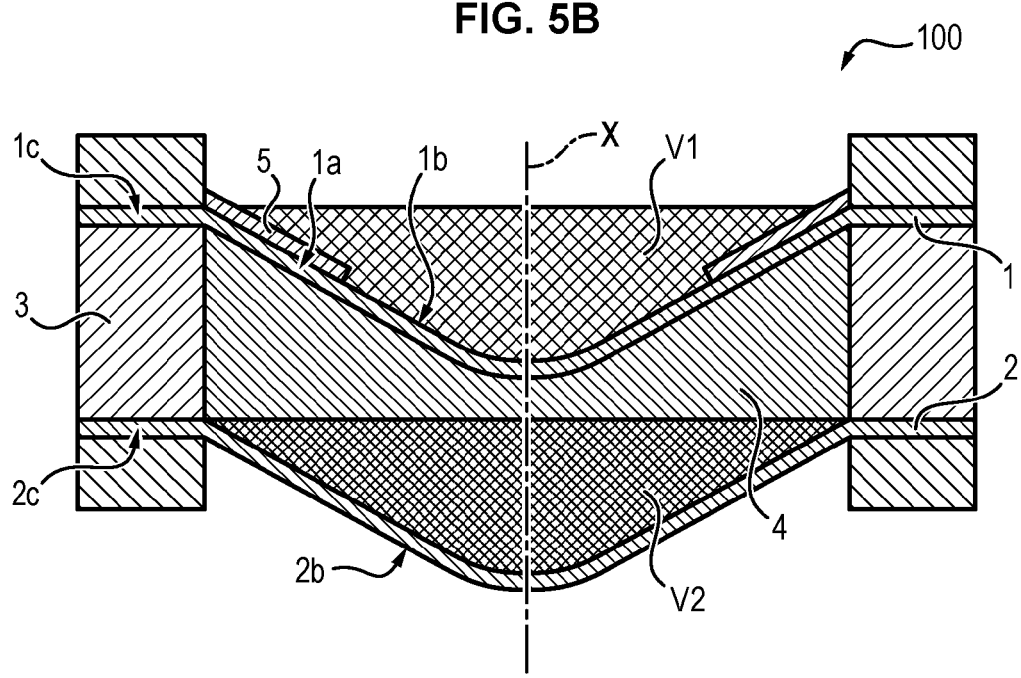
FIG. 5B shows fluid volumes displaced during deformation of membranes in this configuration.

FIGS. 5A and 5B correspond to a first embodiment of the optical device 100.

FIG. 5A shows the deformation of membranes 1 and 2 under the effect of a displacement of the fluid 4 caused by application to the actuation device 5 of electrical actuation voltage less than a determined threshold.

The actuation device 5 deforms the area of actuation 1a of the membrane 1 towards the fluid 4 (direction of arrows) and, to the extent where its stiffness is sufficient, the central part 1b of the membrane 1 deforms in the same direction.

Since the fluid pressure necessary for deforming the membrane 2 is too low to deform the central part 1b of the membrane 1, the diopter formed by the first membrane is concave/divergent and the diopter formed by the second membrane is convex/convergent.

As is evident in FIG. 5B, the volume of fluid displaced by the deformation of the membrane 1 (shown by the hatched area V1) is equal to the volume absorbed by the deformation of the membrane 2 (shown by the hatched area V2).

FIGS. 6A and 6B correspond to a second embodiment of the optical device 100.

From a certain fluid pressure, generated by application to the actuation device 5 of electrical actuation voltage greater than the threshold mentioned earlier (the direction of actuation still being towards the fluid, but sketched by the double arrows to represent the increase in range of deformation due to the increase in electrical actuation voltage relative to FIG. 5A), the central part 1b of the membrane 1 deforms significantly under the effect of the fluid pressure.

As is evident from FIG. 6A, the actuation region 1a of the membrane 1 remains deformed in the same direction as in FIG. 5A, but the central part 1b of said membrane 1 deforms in a direction opposite the direction of FIG. 5A under the effect of the pressure of the fluid 4 displaced by the actuation device 5.

The conservation of the volume of fluid is maintained but in this embodiment it integrates the volume associated with deformation of the central part 1b of the first membrane.

In FIG. 6A, the hatched region V0 represents the volume of fluid displaced by the actuation of the membrane 1 relative to the rest position by supposing that no fluid pressure is exerted on said membrane.

In FIG. 6B, the hatched regions V1 and V2 illustrate the volumes of fluid absorbed by deformation of the two membranes. The total of the volumes of fluid represented by the regions V1 and V2 is equal to the volume of fluid represented by the region V0 due to conservation of the volume of fluid.

In this second embodiment, the diopter formed by the membrane 1 is planar, or even convergent.

In this second embodiment, both diopters participate in the variation in focal length of the device and produce greater variations in focal length.

The threshold of electrical voltage mentioned hereinbelow can be determined experimentally by varying the electrical actuation voltage of the actuation device of the membrane and measuring the electrical voltage from which inversion of the curve of the central part of the first membrane is observed.

To procure such inversion of the deformation of the central part of the first membrane between the first and the second embodiment, with the actuation device still being deformed in the same direction, the first membrane must have sufficient stiffness.

Figure 4A:
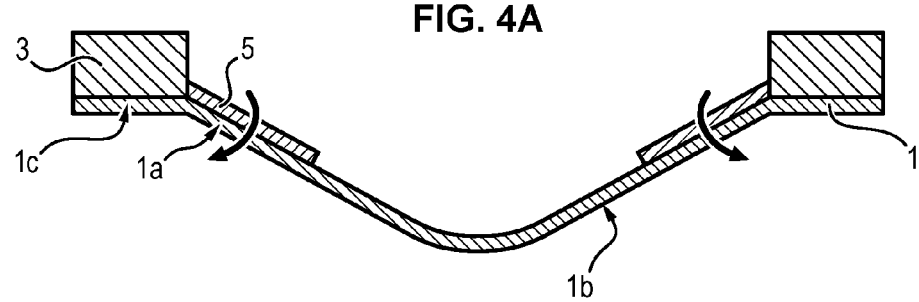
FIG. 4A illustrates reference deformation (that is, not subject to fluid pressure) of the first membrane of an optical device according to the invention; by way of comparison
Figure 4B:
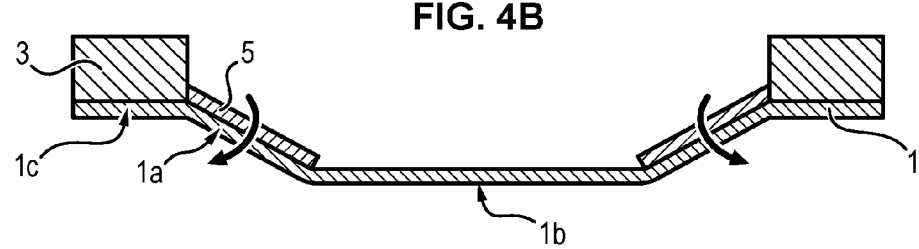
FIG. 4B illustrates reference deformation of a membrane not suitable for carrying out the invention due to inadequate rigidity.

FIGS. 4A and 4B present two examples of membranes having different degrees of stiffness, shown here anchored on a support but not subject to fluid pressure. In these two cases it is given that the membrane is planar at rest.

In FIG. 4A, the membrane 1 has sufficient stiffness to carry out the invention, which results in that when the actuation device 5 of said membrane is activated, the central part 1b of the membrane 1 deforms in the extension of the intermediate area 1a on which the actuation device 5 is arranged. In the event where the membrane has uniform stiffness over its entire deformable part, the tangents to the membrane 1 on either side of the junction between the actuation region 1a and the central part 1b are merged.

But FIG. 4B illustrates a membrane having insufficient stiffness to implement the invention. Contrary to the membrane of FIG. 4A, this membrane deforms only in the intermediate area 1a where the actuation device is located, but its central part 1b does not deform and remains planar, simply by translating relative to its rest position.

More precisely, the stiffness of the membrane 1 is defined such that the curve obtained when the membrane is actuated (cf. FIG. 4A) conforms to the preferred optical properties (divergence, convergence, etc.) for the device (cf. step 1 of the sizing example developed later).

In the presence of the fluid 4, a sufficiently stiff membrane 1 such as that of FIG. 4A causes pressure in the fluid, connected to the force deployed by the actuation device 5, and consequently movement of the fluid.

Coupling of such a membrane to the membrane 2 which is also deformable produces the two operating modes presented in FIGS. 5A and 6A.

To ensure that the membrane 1 has sufficient stiffness, those skilled in the art can use fine-element modelling software (Comsol for example) to determine the reference deformation (without fluid pressure) of the membrane under the effect of actuation (configuration of FIG. 4A).

To dimension the membranes 1 and 2 and adjust their stiffness to obtain the preferred deformations, those skilled in the art can use a circular membrane deformation model such as that described in [11].

The relation between fluid pressure p applied uniformly to the membrane and different representative parameters of the membrane is given by the formula:

$$p = 4\frac{h}{R^2}\omega\left(\sigma_r + \frac{2.83}{4}\frac{E}{(1-v^2)}\frac{\omega^2}{R^2}\right)$$

where:
h is the thickness of the membrane,
R is the radius of the membrane subject to the pressure p,
$\sigma_r$ is the residual stress in the membrane,
ω is the deflection at the center of the membrane,
v is the Poisson coefficient of the material constituting the membrane,
E is the Young's modulus of the material constituting the membrane.

For each of the two membranes the relevant material, the geometry and the residual stress in the membrane can be adjusted to obtain stiffness and deformation in keeping with the expectations described hereinabove.

At given pressure, conservation of the volume of fluid is easily calculated from the deformations of each membrane.

Finally, the optical power (that is, the inverse of the focal distance) of an optical device with two membranes is given by the following formula using approximation to a thin lens:

$$\frac{1}{f} = (n-1)\left(\frac{1}{R_1} - \frac{1}{R_2}\right)$$

where:
n is the refraction index of the fluid,
$R_1$ is the radius of curvature of the spherical diopter constituted by the first membrane (central optical part),
$R_2$ is the radius of curvature of the spherical diopter constituted by the second membrane (central optical part),
In terms of sign convention for $R_1$ and $R_2$, in the case of a biconvex lens $R_1>0$ and $R_2<0$ (optical power is positive).

In the first embodiment which corresponds to electrical actuation voltage of the actuation device 5 of the membrane 1 less than the above threshold, many optical configurations can be obtained according to the respective sizing of the first and second membrane.

Figure 7A:
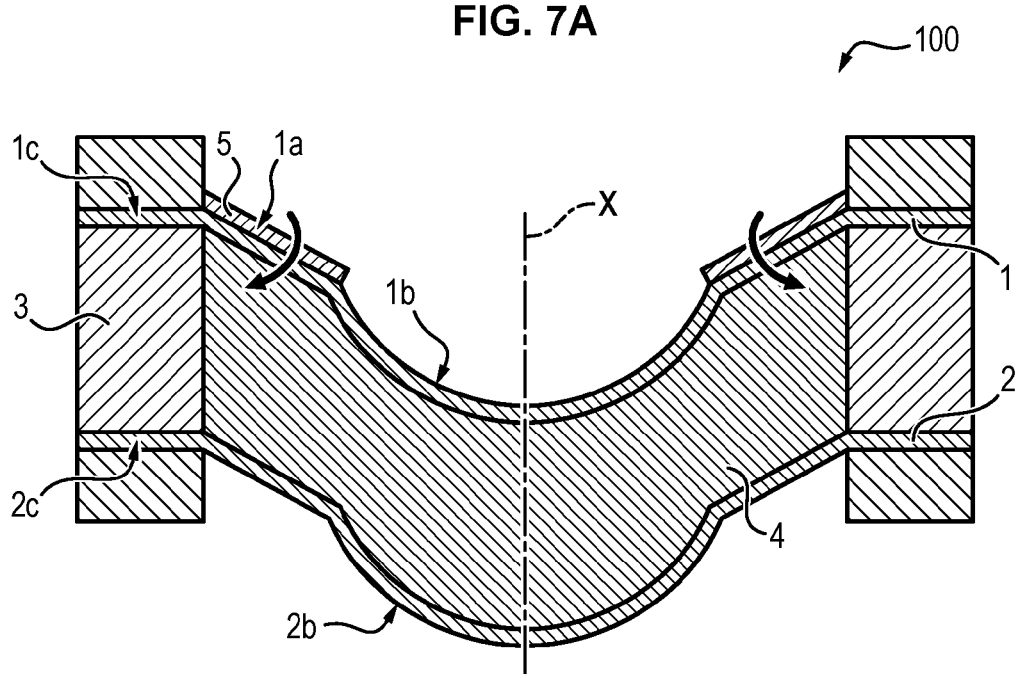
FIG. 7A illustrates an optical device according to an embodiment of the invention, in which the geometry of the two membranes is substantially identical, by way of hatching
Figure 7B:
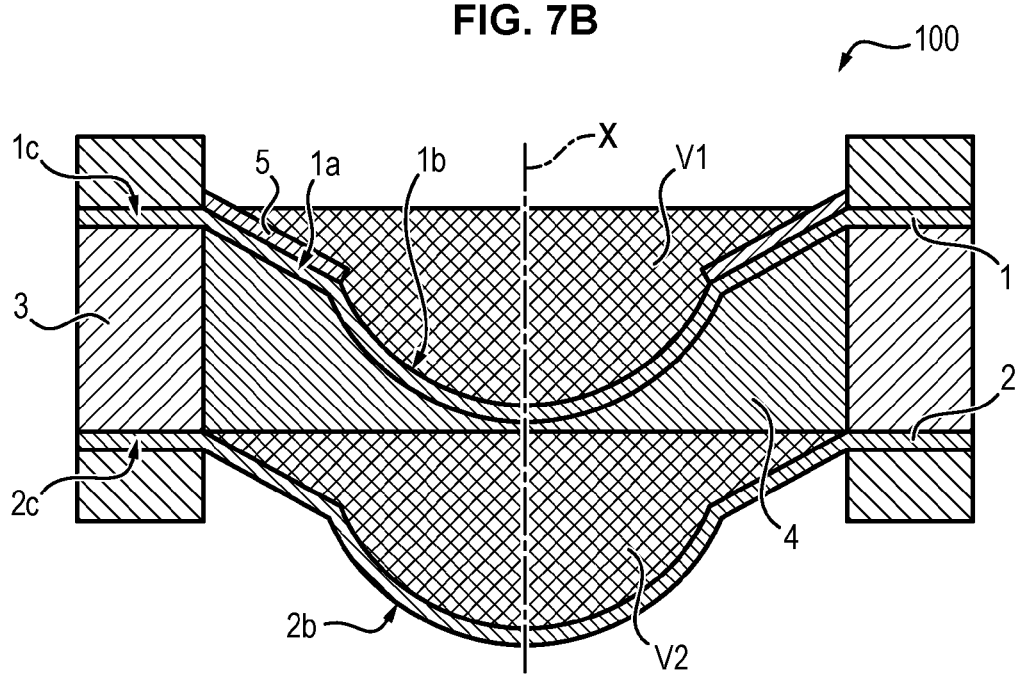
FIG. 7B shows the volumes of fluid displaced during deformation of membranes in the configuration of FIG. 7A.

FIGS. 7A and 7B illustrate an embodiment of the optical device 100 in which the membranes 1 and 2 have a substantially identical geometry, especially substantially equal diameters.

It is clear that "diameter" means the diameter of the deformable part of a membrane, comprising the central part and, if needed, the actuation area, but excluding the peripheral anchoring area which is fixed.

The device 100 is shown here in its first embodiment.

In the event where the geometries of the membranes 1 and 2 are substantially identical (essentially with respect to their diameter), the curves of both diopters are substantially equal.

The resulting optical power is therefore not very high but it can be finely adjusted.

Also, such an optical configuration has advantages other than the sole variation in optical power. In effect, sizing the device by adequately adjusting the fluid thickness between both membranes, and the focal length associated with each of the two membranes can for example produce an afocal optical device having an effect on magnification.

According to other embodiments the geometry of both membranes (the diameter especially) can be adapted to preferably produce a configuration of divergent meniscus or convergent meniscus in the first embodiment.

FIGS. 8A and 8B illustrate an optical device 100 in which the membrane 1 has a diameter less than that of the membrane 2.

As in FIGS. 8A and 8B, to obtain a divergent lens in the first embodiment the convergent curve of the diopter formed by the membrane 2 has to be minimized and the curve of the diopter formed by the membrane 1 has to be maximized. For a same volume of fluid 4 (hatched regions V1 and V2 in FIG. 8B representing equal volumes), a divergent configuration is obtained by increasing, relative to the device of FIG. 6A, the diameter of the membrane 2 and decreasing the diameter of the membrane 1 which is actuated.

Inversely, as in FIGS. 9A and 9B, to obtain a convergent lens in the first embodiment, the convergent curve of the diopter formed by the membrane 2 has to be maximized and the curve of the diopter formed by the membrane 1 has to be minimized. For a same volume of fluid 4 (equality of volumes being represented by the hatched areas V1 and V2 in FIG. 9B), such a divergent configuration is obtained by decreasing, relative to the device of FIG. 7A, the diameter of the membrane 2 and by increasing the diameter of the membrane 1 which is actuated.

The optical power of the devices illustrated in FIGS. 8A and 9A is therefore much higher than that of the device of FIG. 7A.

In the second embodiment, in which the electrical actuation voltage of the actuation device of the first membrane is greater than the above threshold (double arrows), many optical configurations can also be obtained according to the respective sizing of the first and of the second membrane.

For example, in the second embodiment the different geometric configurations of the optical device illustrated in FIGS. 7A, 8A and 9B produce very different convergent optical powers (planar convex lens, symmetrical biconvex lens or even asymmetrical biconvex lens).

According to an embodiment of the invention, to increase the optical power of the device in the second embodiment it can be advantageous also to provide the second membrane with an actuation device.

FIGS. 10A and 10B illustrate an optical device 100 comprising an actuation device 5' of the membrane 2 arranged on an area 2a of the intermediate membrane between the peripheral anchoring area 2c and the central part 2b of the membrane 2.

As in the embodiments described previously, the membrane 1 is always provided with the actuation device 5.

In the first embodiment (electrical actuation voltage of the device 5 lower than the above threshold), the actuation device 5' is not activated and the membrane 2 therefore performs as described previously in reference to FIG. 5A (cf. FIG. 10A).

In the second embodiment (cf. FIG. 10B), the actuation device 5' is activated to increase the pressure in the fluid 4 and accentuate the convergent deformation of the diopter formed by the membrane 2 relative to the configuration of FIG. 6B.

The actuation device 5' of the second membrane can be similar to that of the first membrane, that is, based on the same technique of actuation in a single direction.

However, it is also possible to design the device 5' such that, in contrast to the device 5, it can deform in two opposite directions.

So, in a first operating phase, this device 5' is activated in the same direction as that of the device 5, therefore opposite the fluid 4, to absorb the volume of fluid displaced by the membrane 1 and maintain a diopter corresponding to the second unchanged membrane (advantageously plane).

Then, in a second operating phase, the device 5' is activated in the opposite direction, specifically towards the fluid 4, to accentuate the variation in focal length of the optical device.

FIGS. 11A to 11C illustrate other configurations of the optical device, in which both membranes are actuated. The device is shown in its second embodiment.

In FIG. 11A, the actuated membrane 1 forms a plane diopter and the membrane 2, which is actuated in the direction opposite that of the membrane 1, forms a convergent meniscus.

In FIG. 11B, the actuated membrane 1 forms a convergent meniscus and the membrane 2, which is actuated in the direction opposite that of the membrane 1, forms a convergent meniscus.

In FIG. 11C, the actuated membrane 1 forms a more convergent meniscus than that of FIG. 11B, and the membrane 2, which is actuated in the direction opposite that of the membrane 1, forms a more convergent meniscus than in FIG. 11B.

In the examples described previously, the first membrane formed a divergent diopter in the first embodiment, then a plane then convergent diopter in the second embodiment.

Figure 12A:
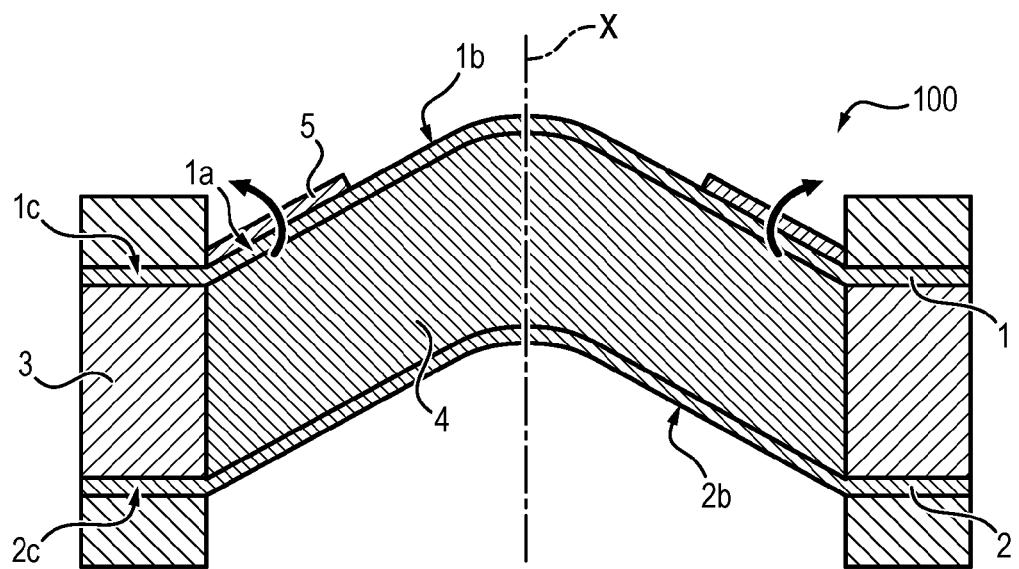
FIGS. 12A and 12B illustrate other possible configurations of an optical device according to the invention.
Figure 12B:
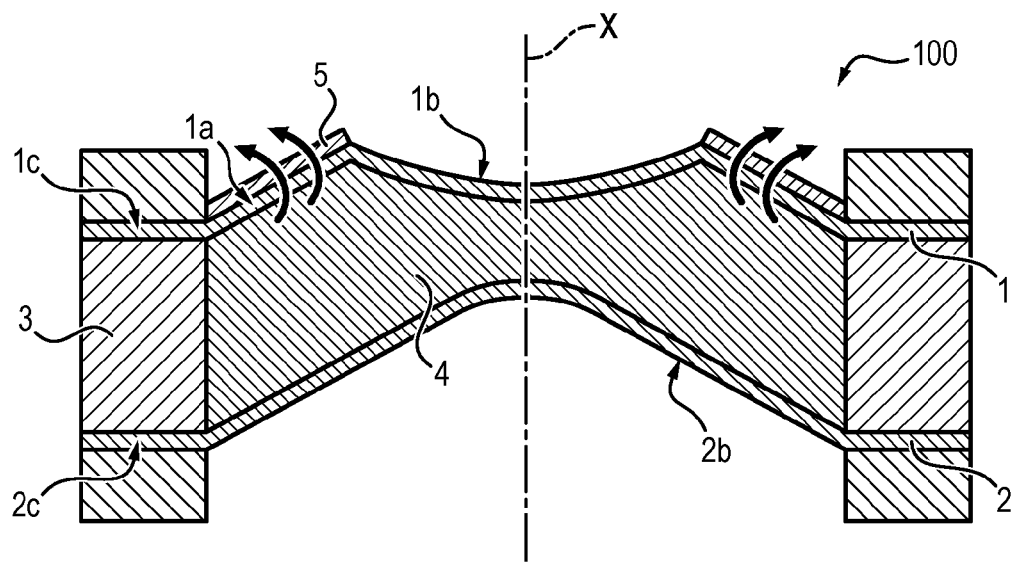

However, as illustrated in FIGS. 12A and 12B, it is also feasible by using an actuation device 5 operating in a single direction opposite the fluid 4, contrary to the previous examples, that the first membrane 1 forms a convergent diopter in the first embodiment (cf. FIG. 12A) then a plane then divergent diopter in the second embodiment (cf. FIG. 12B).

There is therefore a very large number of possible combinations, from which expert can define what best suits the preferred application and the preferred performance.

Preferably, the optical axes of both membranes are aligned, but it is also possible in other embodiments not to align said optical axes.

Also, the optical device can comprise a stack of more than two membranes, the membranes being coupled mechanically by way of a volume of fluid maintained between two consecutive membranes, where the nature of the fluid can be different between two pairs of membranes.

Optionally, the optical device can comprise a substrate having an optical function (for example diaphragm, infrared filter, etc.) between both membranes. The substrate delimits two fluid cavities. To retain the mechanical coupling exerted by the fluid on both membranes, it is ensured that the substrate enables passage of fluid from one cavity to the other so as to obtain equal fluid pressure in both cavities. For this purpose, one or more openings of adequate dimensions is provided in the substrate.

The optical device can be made using microelectronics techniques well known to those skilled in the art, especially techniques for thin-layer depositing of chemical deposit type in vapor phase, physical deposit in vapor phase, electrodeposition, epitaxy, thermal oxidation, evaporation, film lamination. Also, anchoring the membranes on the support may involve adhesion techniques.

The membranes 1, 2 can be made based on organic materials such as polydimethylsiloxane, polymethyl methacrylate, polyethylene terephthalate, polycarbonate, parylene, epoxy resins, photosensitive polymers, silicones, or mineral materials such as silicon, silicon oxide, silicon nitride, polycrystalline silicon, diamond carbon. Membranes can comprise a single layer of the same material or a stack of layers of different materials.

Also, the membranes can have stiffness identical at every point of their surface, or by contrast have a different degree of stiffness in different regions. In this case, it is the central part which must respect the stiffness conditions disclosed earlier.

The fluid 4 can be a liquid such as propylene carbonate, water, an index liquid, a optic oil or an ionic liquid, a silicone oil, an inert liquid with high thermal stability and low saturating vapor pressure.

The fluid can optionally be a gas such as air, nitrogen or helium mainly for an optical device operating in reflection.

If the optical device functions in transmission, those skilled in the art will select the refraction index of the fluid as a function of the preferred optical performances.

According to an advantageous embodiment of the invention, the optical device can incorporate compensation means of variation in the focal distance due to variation in the temperature to which the device is subjected. In fact, a difference in thermal dilation coefficient between the different components can lead to modification in the focal distance of the optical device when the temperature varies by a significant amount.

Such compensation means are described in detail in document WO 2011/032925.

Exemplary Embodiment of an Optical Device

The device 100 can be made for example according to the following method.

Two sub-assemblies each formed from a silicon substrate and a membrane are produced first. In this respect reference could be made to document FR 2 962 557 which describes a manufacturing method of such a sub-assembly.

The material of each membrane is advantageously polymer (such as siloxane resin) or a mineral material (such as silicon oxide, polycrystalline silicon, silicon nitride).

Making each membrane involves controlling the residual stress in the membrane such that it is not excessively compressive (to avoid any bucking of the membrane) or excessively tensile (to avoid compromising its deformation as a function). Advantageously, the residual stress in each membrane is slightly tensile.

The actuation device of the first membrane is advantageously a piezoelectric device, preferably based on PZT.

Next, both sub-assemblies are assembled by encapsulating fluid.

This technique is conventionally used in making LCD screens and therefore will not be described in detail here.

Advantageously, an adhesive is used to assemble both substrates and ensure the distance separating them.

The fluid, for example an index liquid or optical oil, is previously dispensed on one of the substrates.

Finally, both membranes are successively released by etching the silicon substrates in the central part and the actuation area.

Example of Sizing of the First and of the Second Membrane of the Optical Device.

A methodology for design of an optical device which has zero optical power at rest and which, during actuation of the first membrane, becomes successively divergent then convergent is detailed hereinbelow.

Step 1: Choice of the Radius of the First Membrane

To obtain the preferred optical performance, a first step consists of defining the radius of the first membrane and the required deflection and the curve.

For example, via a membrane of 1 mm radius, deflection of the membrane of 85 µm corresponds to variation in focal length of −85 diopters with a liquid index 1.5 (relative to a rest position plane to infinity and for deflection of the membrane towards the liquid).

In this first step, the preferred variations in optical power must be over-evaluated since they will finally be smaller. In fact, they are compromised by the effect of the second membrane: cf. shifting from −85 diopters to finally −7 diopters on completion of calculating sizing in the example developed hereinbelow).

First, the width of the actuation region on the membrane is determined approximately as a function of the radius total of the membrane.

For a radius of 1 mm, this width of the actuation region is first fixed at 500 µm.

From the geometric elements defined hereinabove (radius of the membrane, width of the actuation region) and as a function of the intrinsic properties of the first membrane (Young's modulus, Poisson coefficient, internal constraint) and its thickness, actuation of this membrane to obtain the preferred deflections and curves is dimensioned from techniques from the prior art.

In fact, the deformed shape of the first membrane in the absence of fluid presented in FIG. 4A is obtained by the effect of the actuator(s) located on the periphery of this membrane. An example of stressing of the actuation device to obtain such a deformed shape is flexion torque applied to the membrane.

The torque to be applied to the membrane as a function of its geometry (thickness, diameter) and its properties (Young's modulus, internal constraint) to obtain the required deformed shape without fluid can be determined by using the equations detailed in [13] or by making simulations by finished elements (with software COMSOL, for example).

The piezoelectric actuation can be sized by using techniques of the prior art.

In the case of piezoelectric actuation, reference can be made for example to the model detailed in [14] or [15].

Therefore, for a given actuation device (and electrical voltage applied to this device), it is possible to determine the associated curve of the membrane.

Since the present invention is not associated with actuation technology, sizing of this part of the device, which is within the scope of those skilled in the art, is not described in detail here.

In the example developed here, the properties of the first membrane are Young's modulus of 100 MPa, Poisson coefficient of 0.35, thickness of 200 µm and internal constraint of 0.5 MPa.

Step 2: Choice of the Radius of the Second Membrane

First, it is assumed that under the effect of actuation of the first membrane all fluid chased by the first membrane deforms the second membrane.

The radius used for the second membrane directly influences the optical power of the device. To have a divergent device, the radius of the second membrane has to be bigger than that of the first membrane, as illustrated in FIG. 8A. For a radius of the second membrane of 1.1 mm, the optical power of the device associated with deflection of the first membrane of 85 µm is no longer −85 diopters but −26 diopters.

Step 3: Choice of Mechanical Properties of the Second Membrane

The properties of the second membrane (Young's modulus E, Poisson coefficient v, internal constraint $\sigma_r$) are selected so that its behavior is non-linear given its radius and required deflections.

It is in fact necessary that during actuation of the first membrane and under the effect of pressure of the fluid, deflection of the second membrane to some extent saturates to enable deformation of the center of the first membrane (counter-reaction of the fluid on the first membrane). If ω is the deflections of the second membrane and R its radius, the non-linearity becomes preponderant in deflection of the second membrane when:

$$\frac{4 \cdot \sigma_r (1 - v^2)}{2.83 \cdot E} - \frac{\omega^2}{R^2} < 0$$

Given the data used in both first steps, a mineral material of Young's modulus 230 GPa, Poisson coefficient 0.35 and internal constraint 0.5 MPa are selected for the second membrane.

Once the intrinsic properties of the second membrane are defined, its thickness needs to be fixed to determine the range of corresponding fluid pressure in the cavity, over the entire range of actuation of the first membrane.

An iterative approach can be necessary to fix the thickness of the second membrane as a compromise must be found.

In fact, if the thickness of the second membrane is too small, only the second membrane deforms under the effect of fluid pressure caused by actuation of the first membrane. The optical device will always be divergent (no counter-reaction of the central part of the first membrane).

If the thickness of the second membrane is too large, the second membrane fails to deform sufficiently and the counter-reaction of the central part of the first membrane occurs from the start of actuation of the first membrane. The optical device will then always be convergent.

But it should be noted that the power contributed by the actuation device must be sufficient to generate the required pressure in the cavity.

In the present example, the thickness used for the second membrane is 10 µm.

Step 4: Updating of the Deformed Shapes of Each of the Membranes

With the fluid pressure such as calculated previously, the deformations of the second membrane and of the central part of the first membrane are calculated under the pressure of the fluid and the associated volumes of fluid.

Step 5: Updating of Actuation of the First Membrane

The associated deflection of the first membrane is recalculated, this time given the counter-reaction and deformation of the central part of the first membrane.

In the present example, the deflection initially calculated at 85 µm shifts to 87 µm.

Updating of the data determined in step 1 (sizing and width of the actuation device, intrinsic properties of the first membrane) can be optionally be conducted in this step.

Figure 13:
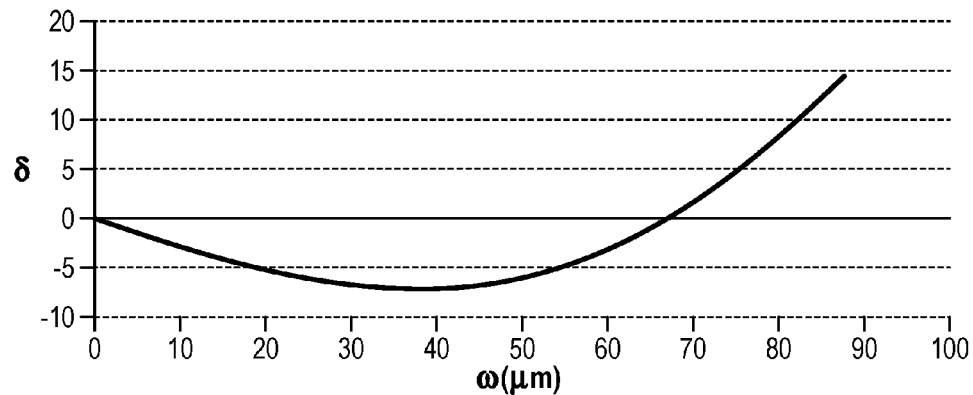
FIG. 13 illustrates the variation in optical power of the device as a function of the deflection of the first membrane.

The result obtained by this approach is illustrated in FIG. 13 which shows the variation in optical power of the device (in diopters) as a function of the deflection ω of the first membrane, in the case of actuation in the absence of the fluid.

Figure 14:
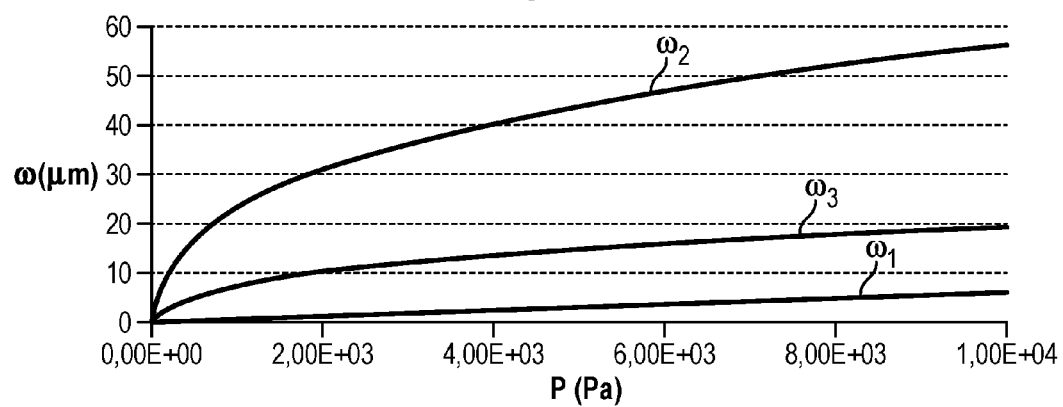
FIG. 14 illustrates the deflection of each membrane as a function of the fluid pressure, FIG. 15 schematically illustrates an imaging device comprising an optical device according to the invention.

FIG. 14 illustrates the deformation of the membranes under uniform fluid pressure. The upper curve ω2 represents the deformation of the membrane 2, the lower curve ω1, the deformation of the membrane 1. The intermediate curve ω3 represents the deformation of the membrane 2 by readjusting its diameter to the dimension of the diameter of the central part of the membrane 1 so as to allow comparison of the stiffness at equal size.

An optical device such as described hereinabove can advantageously be incorporated into an imaging device comprising a zoom function.

Figure 15:
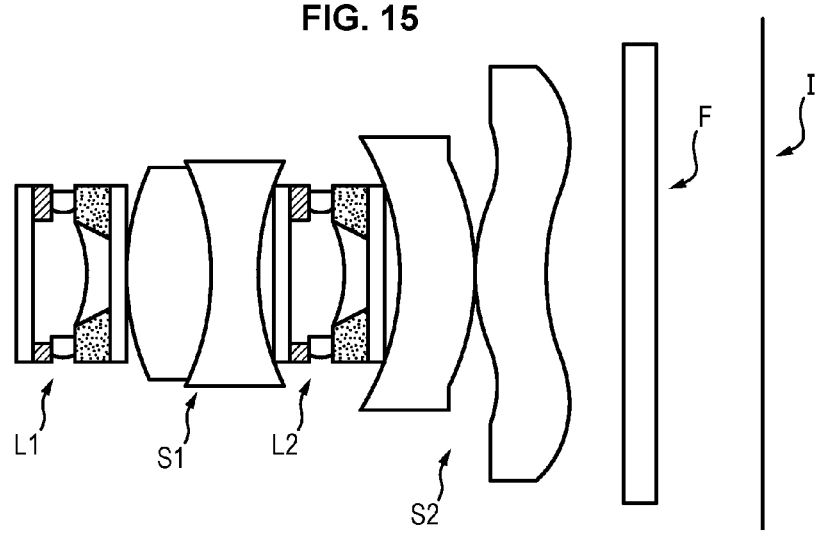

Purely by way of illustration, FIG. 15 shows the structure of an imaging device comprising lenses of fixed focal length S1, S2, liquid lenses L1, L2 and a filter F, the image plane being designated by the mark I.

One at least of the liquid lenses L1, L2 of this device can be an optical device according to the invention.

There are many other possible configurations of such imaging devices and the invention is not limited to the latter.

REFERENCES

[1] Zoom lens Design for a Slim Mobile Camera Using Liquid Lens, Journal of the Korean Physical Society, Vol. 54, No 6, June 2009, pp. 2274-2281
[2] Nonmechanical bifocal zoom telescope, Optics Letters, Vol. 35, No 15, Aug. 1, 2010
[3] Fluidic Zoom Lens system using two single chamber Adaptative Lenses with integrated actuation, IEEE MEMS 2011, Cancun, January 23-27
[4] Fluidic Zoom-Lens-on-a-Chip With Wide Field-of-View Tuning Range, IEEE 2004, pp. 1041-1135
[5] JP 2000-081504
[6] EP 2 034 338
[7] JP 11-133210
[8] FR 2 919 073
[9] FR 2 950 153
[10] FR 2 950 154
[11] The design, Fabrication and Testing of Corrugated Silicon Nitride Diaphragms, Journal of Microelectromechanical Systems, Vol. 3, No. 1, March 1994
[12] S. Timoshenko, Theory of Plates and Shells
[13] A novel ultra-planar, long-stroke and low-voltage piezoelectric micromirror, Journal of Micromechanics and Microengineering 20 (2010)
[14] Analysis of the deflection of a circular plate with an annular piezoelectric actuator, Sensors and actuators A133 (2007).

The invention claimed is:

1. An optical device with focal length variation comprising:
   a first deformable membrane,
   a second deformable membrane,
   a support to which a respective peripheral anchoring area of each of said membranes is connected,
   a constant volume of fluid enclosed between the first and the second membrane, said fluid producing mechanical coupling of said first and second membranes, an actuation device of a region of the first membrane located between the anchoring area and a central part of the first membrane, configured to deform by application of electrical actuation voltage in a single direction of deflection to displace at least a portion of the fluid volume, wherein said displacement of fluid is to cause deformation of the central part of the first membrane, wherein, based at least in part on a stiffness of the central part of the first membrane:

from a rest position in which the actuation device is inactive, the first membrane deforms only in a first direction when electrical actuation voltage less than a threshold is applied to the actuation device and the second membrane deforms to absorb the fluid displacement caused by deformation of the first membrane to minimize the pressure of the fluid on the first membrane, and the actuation region of the first membrane remaining deformed in said first direction, the central part of the first membrane deforms in a second direction opposite the first direction under the effect of the pressure of the fluid displaced by the actuation device when electrical actuation voltage greater than said threshold is applied to the actuation device.

2. The device according to claim 1, wherein the second membrane exhibits stiffness less than the central part of the first membrane.

3. The device according to claim 1, further comprising an actuation device of an actuation region of the second membrane located between the anchoring area and a central part of said membrane, configured to deform by application of electrical actuation voltage.

4. The device according to claim 3, wherein the actuation device of the second membrane is capable of deforming in two opposite directions as a function of the electrical actuation voltage applied to said device.

5. The device according to claim 1, wherein, in a rest configuration, the central part of the first membrane is planar.

6. The device according to claim 5, further comprising a substrate extending between both membranes and comprising at least one fluid passage opening, such that the fluid pressure is identical on either side of said substrate.

7. The device according to claim 1, wherein the material of the first and/or the second membrane is a siloxane resin or mineral material comprising silicon.

8. The device according to claim 1, wherein the actuation device of the first membrane comprises at least one piezoelectric actuator.

9. The device according to claim 1, wherein the first or the second membrane is reflecting.

10. The device according to claim 1, wherein the stiffness of the first membrane is selected so that in the absence of fluid pressure exerted on said membrane, application of electrical actuation voltage to the actuation device causes deformation of the actuation region and of the central part of the membrane, the tangents to the membrane on either side of the junction between the actuation region and the central part being combined.

11. The device according to claim 1, wherein the diameter of the deformable part of the first membrane is different from the diameter of the deformable of the second membrane.

12. The device according to claim 1, characterized in that the diameter of the deformable part of the first membrane is identical to the diameter of the deformable part of the second membrane.

13. The device of claim 1, wherein the device is included in an imaging device.

14. A method for variation of the focal length of an optical device comprising:

applying, to an actuation device of a region of a first deformable membrane, a first electrical actuation voltage less than a threshold, causing a deformation of the first deformable membrane in a first direction while a second deformable membrane deforms to absorb displacement of fluid enclosed between the first deformable membrane and the second membrane caused by deformation of the first deformable membrane to minimize the pressure of fluid on the first deformable membrane; and applying, to the actuation device, a second electrical actuation voltage greater than said threshold, causing a deformation of a central part of the first deformable membrane in a second direction opposite the first direction under the effect of pressure of the fluid displaced by the actuation device, the actuation region of the first membrane remaining deformed in the first direction.

15. The method according to claim 14, wherein:

at rest, the first and the second membrane each form a plane diopter, the first electrical actuation voltage is applied to deform the actuation region and the central part towards the fluid, the second membrane deforming in the direction opposite the fluid, such that the central part of the first membrane forms a divergent diopter and the second membrane forms a convergent diopter, the second electrical voltage is applied to deform the actuation region towards the fluid, displacement of the fluid causing deformation of the central part in the direction opposite the fluid, such that the central part of each of the two membranes forms a convergent diopter.

16. The method according to claim 14, wherein the diameter of the deformable part of the first membrane is less than the diameter of the deformable part of the second membrane, and wherein:

at rest, the first and the second membrane each form a plane diopter, the first electrical actuation voltage is applied to deform the actuation region and the central part towards the fluid, the second membrane deforming in the direction opposite the fluid, such that the optical device forms a divergent meniscus.

17. The method according to claim 14, wherein the diameter of the deformable part of the first membrane is greater than the diameter of the deformable part of the second membrane, and wherein:

at rest, the first and the second membrane each form a plane diopter, the first electrical actuation voltage is applied to deform the actuation region and the central part towards the fluid, the second membrane deforming in the direction opposite the fluid, such that the optical device forms a convergent meniscus.

18. The method according to claim 14, wherein the optical device comprises an actuation device of an actuation region of the second membrane located between the anchoring area and a central part of said membrane, configured to deform by application of electrical actuation voltage, and wherein:

at rest, the first and the second membrane each form a plane diopter, the first electrical actuation voltage is applied to the actuation device of the first membrane to deform the actuation region and the central part towards the fluid without applying electrical actuation voltage of the actuation device of the second membrane, the second membrane deforming in the direction opposite the fluid such that the central part of the first membrane forms a divergent diopter and the second membrane forms a convergent diopter, the second electrical actuation voltage is applied to the actuation device of the first membrane to deform the actuation region towards the fluid and electrical actuation voltage is applied to the actuation device of the second membrane towards the fluid to increase convergence of the diopter formed by the central part of the second membrane.

* * * * *